United States Patent
Ha et al.

(10) Patent No.: US 8,858,010 B2
(45) Date of Patent: Oct. 14, 2014

(54) BACKLIGHT UNIT AND DISPLAY APPARATUS HAVING THE SAME

(75) Inventors: Juhwa Ha, Asan-si (KR); Sang Hoon Lee, Daejeon (KR); Young-Ran Son, Miryang-si (KR)

(73) Assignee: Samsung Display Co., Ltd. (KR)

( * ) Notice: Subject to any disclaimer, the term of this patent is extended or adjusted under 35 U.S.C. 154(b) by 391 days.

(21) Appl. No.: 13/114,754

(22) Filed: May 24, 2011

(65) Prior Publication Data
US 2011/0292639 A1 Dec. 1, 2011

(30) Foreign Application Priority Data
Jun. 1, 2010 (KR) .......... 10-2010-0051937

(51) Int. Cl.
*G09F 13/04* (2006.01)
*G09F 13/08* (2006.01)
*G02F 1/1335* (2006.01)

(52) U.S. Cl.
CPC ........... *G02F 1/133603* (2013.01); *G02F 2001/133607* (2013.01)
USPC ........................................ 362/97.3

(58) Field of Classification Search
CPC ............ G02F 1/133603; G02F 1/133611; G02F 2001/133607
USPC .......... 362/97.1–97.4; 349/61–64, 70
See application file for complete search history.

(56) References Cited

U.S. PATENT DOCUMENTS

| | | | |
|---|---|---|---|
| 7,967,461 B2 * | 6/2011 | Bang et al. ................ 362/97.1 |
| 2009/0080217 A1 * | 3/2009 | Schubert et al. ............ 362/612 |
| 2009/0201665 A1 * | 8/2009 | Goto ........................... 362/97.1 |
| 2010/0110337 A1 | 5/2010 | Shin et al. | |

FOREIGN PATENT DOCUMENTS

KR 1020060109371 A 10/2006

* cited by examiner

Primary Examiner — Jason Moon Han
(74) Attorney, Agent, or Firm — Innovation Counsel LLP

(57) ABSTRACT

A display apparatus includes a display panel, a plurality of spaced apart point light sources outputting light and each having an orientation angle greater than or equal to about 50° and less than about 90°, and an optical plate interposed between the display panel and the point light sources. The optical plate has a base comprising front and rear surfaces and a plurality of convex sections formed on the front surface of the base. Each convex section has a cross section perpendicular to the front surface in which the cross section has a form of a segment of an ellipse including an arc of an ellipse and a chord linking both ends of the arc while satisfying an equation, $$1.0 < \frac{b}{a} < 2.5,$$

when a minor axis of the ellipse has a length of 2a, and a major axis of the ellipse has a length of 2b.

21 Claims, 14 Drawing Sheets

BACKLIGHT UNIT AND DISPLAY APPARATUS HAVING THE SAME

CROSS-REFERENCE TO RELATED APPLICATION

This application relies for priority upon Korean Patent Application No. 10-2010-0051937 filed on Jun. 1, 2010, the contents of which are herein incorporated by reference in their entirety.

BACKGROUND

1. Field of Disclosure

The present disclosure of invention relates to a backlight unit and a display apparatus having the same.

2. Description of Related Technology

An LCD (Liquid Crystal Display) device typically includes a transmissive display panel assembly structured to display an image by controlling intensity of light rays passed therethrough. The display panel assembly generally requires an additional light source because the LCD display panel assembly itself is a non-emissive optics device. Accordingly, the LCD device normally includes a backlight unit to supply backlighting light to the display panel assembly.

The backlight unit may include one or more linear light sources or point light sources, and one or more optical processing sheets structured to transmit light emitted from the light sources to the display panel assembly while further processing the sourced light as it is transmitted through. The optical processing sheets typically function to cause the linear light sources or the point light sources to appear as much as possible (where next said goal is the desired ideal), as if they were a homogenous surface light source with enhanced light brightness rather than as a plurality of discrete light sources.

Recent market demands trend towards LCD devices with increased slimness, lower weight and improved image quality. To realize slimmer and slimmer display devices, distances between the light sources and the optical processing sheets of the backlight unit generally need to be narrowed. However, if the spacing interval between the light sources and the optical processing sheet(s) is narrowed too much, a defect in output light homogeneity; such as a bright point or a dark point may occur.

SUMMARY

The present disclosure of invention provides a backlight unit capable of improving display slimness while retaining output light homogeneity and image quality and a display apparatus having the same.

In one aspect, a display apparatus includes a display panel and a backlight unit. The backlight unit includes a plurality of spaced apart point light sources each having an orientation angle greater than or equal to about 50° and less than about 90° and an optical plate interposed between the display panel and the point light sources. The optical plate includes a base including front and rear surfaces and a plurality of convex sections formed on the front surface of the base, Each convex section has a cross section perpendicular to the front surface in which the cross section has a form of a segment of an ellipse including an arc of an ellipse and a chord linking both ends of the arc. The ellipse satisfies an Equation 1.

$$\frac{x^2}{a^2} + \frac{y^2}{b^2} = 1 \left( \text{wherein}, 1.0 < \frac{b}{a} < 2.5 \right)$$ Equation 1

The convex sections reflect or transmit light according to a traveling angle of light, which is defined by a traveling direction of the light with respect to the front surface of the base. When the traveling angle is in a range not less than about 30° to about 90°, transmittance of the light is greater than a reflective rate of the light. When the traveling angle is in a range of about not less than 0° to about 30°, the transmittance of the light is lower than the reflective rate of the light.

The optical plate is structured to encourage internal reflection therein of oblique light rays received from the spaced apart discrete light sources. The internally reflected light is thereby repositioned away from the discrete light source that sourced it and a more uniform distribution of light is provided. Other aspects will be appreciated from the below detailed description.

DETAILED DESCRIPTION

Figure 1:
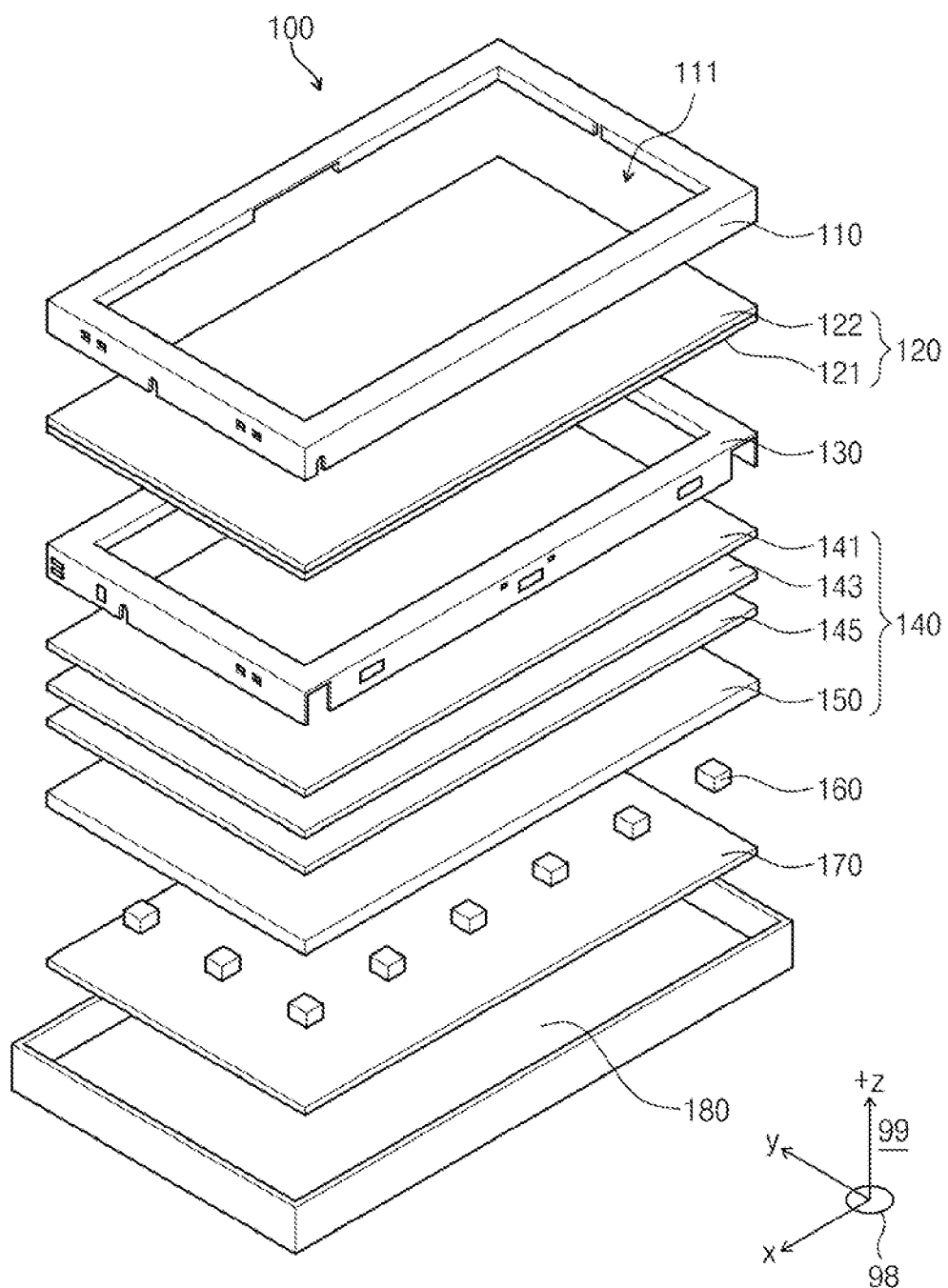
FIG. 1 is an exploded perspective view showing a display apparatus according to an exemplary embodiment including an optical plate, a plurality of discrete light sources and a reflective plate.

Hereinafter, exemplary embodiments in accordance with the present teachings will be described in detail with reference to accompanying drawings. However, the present teachings are not limited to the following embodiments but include various changes, substitutions and modifications within the technical scope and spirit of the present disclosure.

In the drawings, the sizes of layers and regions can be magnified for the purpose of clear explanation. The terms "first", "second" and the like can be used to explain various elements but the elements are not limited to such terms. The terms are used to distinguish one element to the other element. Thus, an element referred to as a first element in one embodiment can be referred to as a second element in another embodiment. Unless the context otherwise requires, the singular expression may not exclude the plural expression.

In the following description, the terms "include" or "comprises" are used to indicate the feature, number, step, operation, elements, parts or combination thereof without excluding other feature, number, step, operation, elements, parts or combination thereof. It will be understood that when an element, such as a layer, a film, a region, or a plate, is referred to as being 'on' or 'under' another element, the element can be directly on another element or intervening element may also be present therebetween. In addition, when an element is referred to as being "directly on" other element, intervening layers may not be present therebetween.

FIG. 1 is an exploded perspective view showing a display apparatus 100 according to a first embodiment. The three dimensional perspective view has corresponding orthogonal X, Y and Z axes of reference as shown at 99. A hypothetical planar circle 98 may be drawn on the XY plane of the 3D reference frame 99 centered about its origin.

Referring to FIG. 1, the display apparatus 100 according to the first embodiment includes a display panel assembly 120, an underlying mold frame 130, a backlight unit below it, and a lower cover 180 at the bottom. The display apparatus 100 also has an upper cover 110. The backlight unit includes an optical processing member 140, a plurality of point-type discrete light sources 160, and a reflective plate 170 under the light sources 160.

The display panel 120 displays an image at the front thereof for viewing by a user (not shown) facing the front and looking towards approximately the −Z direction, although perhaps with a moderate inclination angle. Aside from being of an LCD type, the display panel 120 may be another of various display panels types that depend on backlighting, such as an electrophoretic-type display panel for example. Here, the fully transmissive LCD type will be used as an exemplary embodiment of the display panel 120.

The display panel 120 may be manufactured in the form of a rectangular plate having a longer side and a shorter side. The display panel 120 may have various side and thickness dimensions. For example, the display panel 120 may have a diagonal length on its front display area of about 40 inches to about 50 inches. The LCD version of the display panel 120 includes a first substrate 121, a second substrate 122 opposite to and spaced apart from the first substrate 121, and a liquid crystal material layer (not shown or referenced) interposed between the first and second substrates 121 and 122. The display panel 120 may include electric field electrodes disposed thereon to drive the liquid crystal layer and to thereby display a desired image. To drive the liquid crystal layer, the first substrate 121 may be provided thereon with a plurality of thin film transistors (TFTs) and a plurality of pixel-electrodes, and the second substrate 122 may be provided thereon with a common electrode and a color filter layer. In this case, the first and second substrates 121 and 122 may be respectively named the TFT array substrate and the color filter substrate. Since the liquid crystal layer is non-emissive, the display panel 120 requires a front and/or backlighting light source to produce a user viewable image. According to one embodiment, the point-type discrete light sources 160 are provided in a particular arrangement relative to the optical processing member 140.

The mold frame 130 is provided along an edge of the display panel 120. The panel-supporting mold frame 130 has a substantially rectangular ring shape. The mold frame 130 supports the display panel 120 above it and houses the optical processing member 140 in an interior lower portion of the mold frame 130. The mold frame 130 is coupled with the lower cover 180 so that the mold frame 130 receives for protective housing therein the optical processing member 140, the array of point light sources 160, and the reflective plate 170. Although a singular mold frame 130 may be provided as shown in FIG. 1 to provide its housing function, in an alternate embodiment, a plurality of mold frame sections (not shown) may be provided and assembled to form the mold frame 130.

The optical processing member 140 is provided below the display panel 120. The point light sources 160 are provided below the optical processing member 140 to supply light to the display panel 120 through the optical processing member 140. The optical processing member 140 controls the direction and the density of light rays emitted from the point light sources 160. In one embodiment, the optical processing member 140 includes a protective sheet 141, a prism sheet 143, a diffusion sheet 145, and an optical plate 150.

The optical plate 150 is structured to redirect and re-diffuse light emitted from the spaced apart discrete light sources 160 to thus more uniformly provide the light to the display panel 120. Details of the optical plate 150 will be described below.

The diffusion sheet 145 further diffuses the light. The prism sheet 143 collects and redirects light, which has been diffused by the diffusion plate 145, into light rays directed in the direction substantially perpendicular to a plane (XY) of the display panel 120. Most of the light that has passed perpendicularly through the prism sheet 143 also travels perpendicularly through the display panel 120 so that uniform brightness distribution can be achieved. The protective sheet 141, which is placed at the uppermost portion of the optical processing member 140, protects the prism sheet 143 from scratching. One or more of the protective sheet 141, the prism sheet 143 or the diffusion sheet 145 may be omitted. In addition, a plurality of prism sheets 143 and diffusion sheets 145 may be provided while overlapping each other.

The point light sources 160 are provided below the optical processing member 140. The point light sources 160 may include aspherical light emitting diodes (LEDs). Detailed description of the point light sources 160 will be made later. By "aspherical", it is meant here that the light emission pattern of each diode is not uniform in all directions of a spherical coordinate frame having the LED at its center. In one embodiment, each point light source 160 may be treated as substantially a white light emitting point-type source, although again with an aspherical emission pattern.

The reflective plate 170 is provided below the point light sources 160. The reflective plate 170 reflects light, which does not travel toward the display panel 120, so that the path of the light is changed to be re-directed to the display panel 120.

The lower cover 180 is provided below the reflective plate 170. The lower cover 180 is coupled with the display panel 120, the optical processing member 140, the point light sources 160, and the reflective plate 170 to receive the display panel 120, the optical processing member 140, the point light sources 160, and the reflective plate 170.

The upper cover 110 is provided above the display panel 120, and coupled with the lower cover 180. The upper cover 110 is a structure supporting a front peripheral surface of the display panel 120. The upper cover 110 includes a display window 111 to expose a display region of the display panel 120.

Although not shown, the display panel 120 may be provided at one side thereof with a printed circuit board coupled with the thin film transistors array of the display panel 120. Signals output from the printed circuit board are transmitted to the thin film transistors array through signaling wires (e.g., data lines and gate lines), and the thin film transistors responsively apply desired charging voltages to pixel electrodes of the panel 120 according to the signals such that liquid crystal molecules are appropriately driven to display an image.

The distance between the point light sources 160 and the optical plate 150 may be adjusted according to various necessities. For example, in one embodiment, the spacing distance between emitting planes of the respective point light sources 160 and the bottom of the optical plate 150 may be 10 mm or less. The distance from the reflective plate 170 to the display panel 120 may be adjusted, and may be in the range of about 18 mm to about 22 mm. The distance between the point light sources 160 and the optical plate 150, and the distance between the reflective plate 170 and the display panel 120 may be varied and optimized to provide light intensity homogeneity and maximum through-transmission of the sourced light rays when the point light sources 160 and the optical plate 150 according to the here-detailed embodiment are employed.

According to one aspect of the present disclosure, a zenith angle of an output light ray representing the essentially highest intensity among light rays output from each respective discrete light source 160 defines the so-called "orientation angle" (e.g., wide beam orientation angle) of that respective light source. When the point light sources 160 are mounted on a plane, the zenith angle more generally refers to an out-of-plane angle formed between a straight line (Z direction line) passing through the center of the respective point light source 160, perpendicularly to the plane and the traveling direction of the corresponding light ray emitted from the point light source 160. The point light sources 160 used in the embodiment 100 should have an orientation angle (zenith angle of maximum output intensity) greater than 45° and more preferably in the range of about 50° to about 90°. Since the point light sources 160 have an orientation angle greater than a conventional orientation angle of about 0° as found in conventional point light sources, the point light sources 160 used here are referred to as wide-beam-angle point light sources. The wide-beam-angle point light sources mainly output light having the orientation angle in the range of about 50° to about 90° rather than outputting light having its orientation angle in the range of about 0° to about 45° and more specifically, rather than outputting light having its maximum intensity orientation angle in the vicinity of about 0°.

Each point light source 160 may include an aspherical LED. The aspherical LED may include an LED and a lens. The LED emits predominantly white light, and the lens covers the LED to adjust the paths and intensities of light rays emitted from the aspherical LED. The surface of the lens may include a plurality of circular components each having a respectively different curvature radius. Accordingly, the surface of the lens can become a non-spherical surface. As the surface of the lens becomes non-spherical and/or functions aspherically for other reasons, the zenith angles at which light rays of different intensities are emitted from the surface of the lens can be adjusted. (Aspherical emission can be achieved by altering the effective refractive index of the lens at different zenith angles, in place of or in addition to altering the curvature radius at different zenith angles; and thus the term, "aspherical" will be used herein to refer to the generic function of nonuniform light dispersion while the term, "non-spherical surface" is used herein to refer to one way of realizing such nonuniform light dispersion, namely, by forming the lens to have a non-spherical inner and/or outer surface.)

Figure 2:
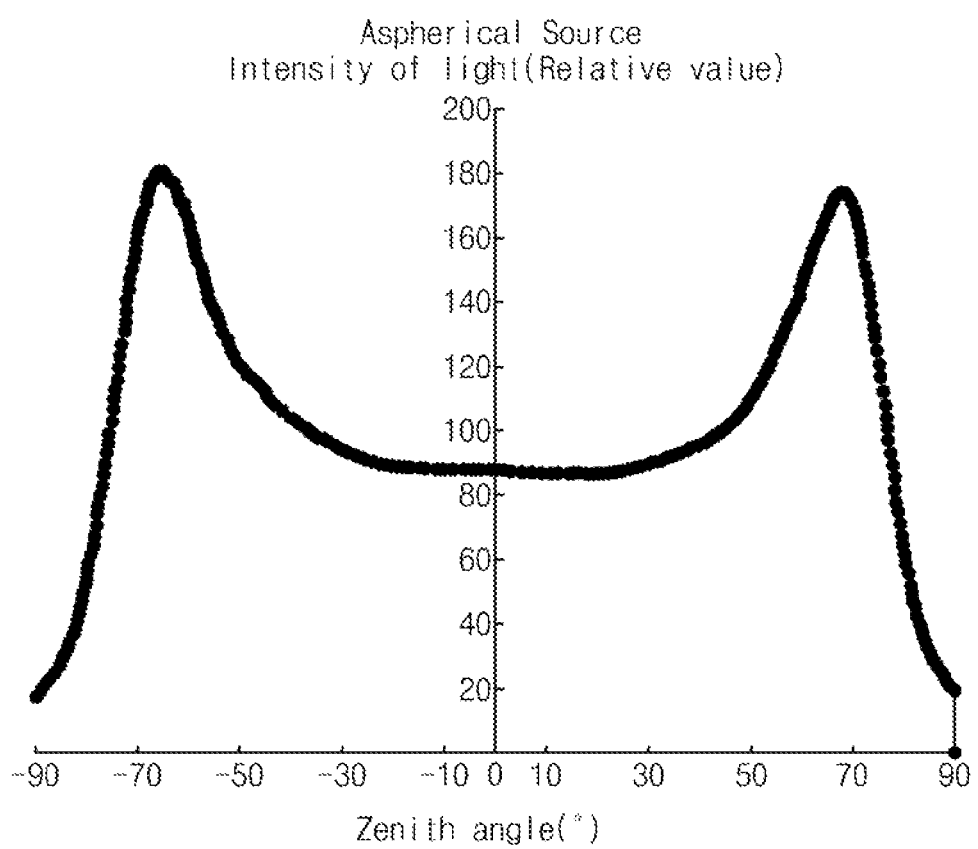
FIG. 2 is a graph showing the intensity of light depending on a zenith angle of one aspherical discrete light source (e.g., white LED) used in the exemplary embodiment.

FIG. 2 is a graph showing the intensity of light as function of a zenith angle of one aspherical LED as used according to an embodiment of the present disclosure. Referring to FIG. 2, the strongest intensity of light is observed at a zenith angle of about 60° to about 70°. This is to be contrasted with a conventional point source where strongest intensity of light may instead be observed at a zenith angle of about 0°. In other words, an amount of light traveling in a transversal direction is greater than an amount of light traveling in a direction perpendicular to the light emitting face of the LED on the basis of the design of the aspherical LED.

An aspherical LED is employed as the light source 160 of the present embodiment for following reasons. A conventional LED emits light upward perpendicularly to an exit surface thereof at a higher ratio. In particular, if the lens of the LED has a spherical surface, the emitted light rays traveling to intersect perpendicularly with the spherical exit surface tend to experience less reflection than emitted light rays traveling to intersect at a different angle with the spherical exit surface. Accordingly, perceived optical density is increased at a point at which the LED emitting surface is provided, so that a user recognizes the point as a bright point. However, when it comes to trying to give the impression of a homogeneous emission surface for the backlighting unit taken in whole, each perceived bright point may be considered as a defect of the display apparatus 100. To enhance the uniformity of light provided toward the display panel 120, the embodiment of the present disclosure provides the aspherical LED whereby the sharp pointedness is diffused by action of the corresponding aspherical output pattern. It is to be understood that the aspherical output pattern shown in FIG. 2 is merely an example.

Figure 3:
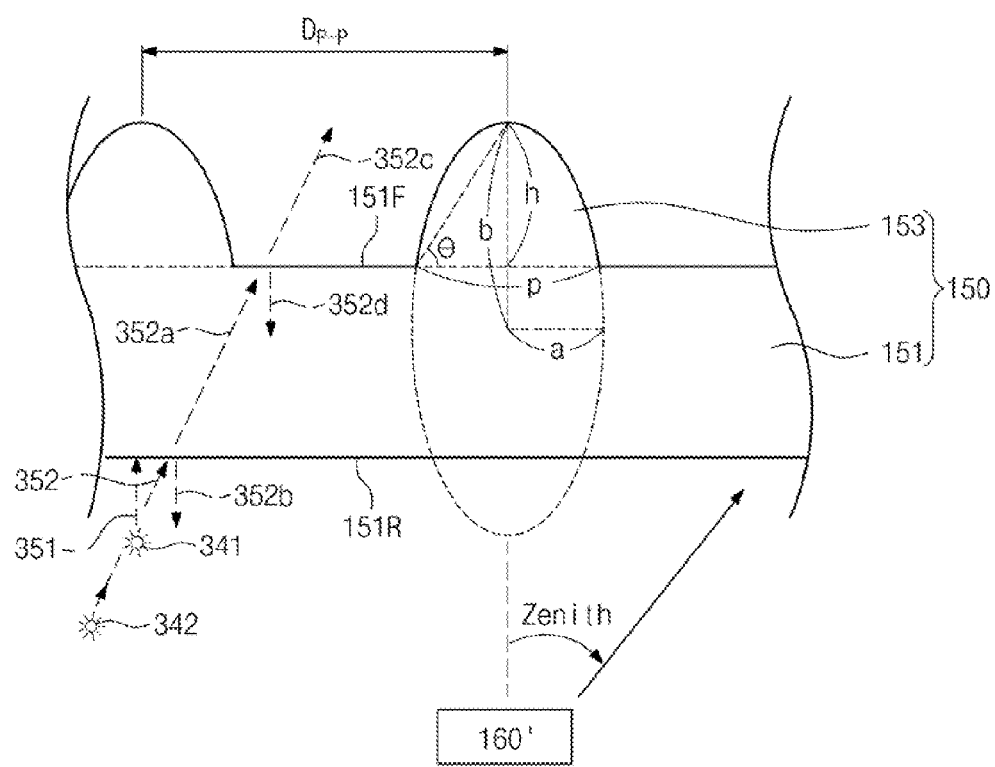
FIG. 3 is a sectional view showing a portion of the optical processing plate shown in FIG. 1 together with a portion of the one aspherical discrete light source of FIG. 2 and a portion of the reflective plate.

FIG. 3 is a sectional view showing a portion of the optical plate 150 of FIG. 1 together with a portion of an adjacent discrete light source 160' and an adjacent portion of the reflective plate 170'.

Referring to FIG. 3, the optical plate 150 according to the here-discussed embodiment includes a base portion 151 and a plurality of convex sections 153 monolithically integrated with and projecting from the base portion 151.

The base portion 151 includes a front planar surface 151F and a rear planar surface 151R opposite to the front surface 151F. The base portion 151 is provided in the form of a rectangular plate having an area identical to or similar to that of the display panel 120.

The convex sections 153 protrude integrally from the base and beyond the front surface 151F of the base portion 151. The convex sections 153 may operate to refract light (reflect or transmit the light) according to the traveling angle formed between the traveling direction of each light ray and the front surface 151F of the base portion 151. More specifically, and as will be understood more clearly further below, the convex sections 153 may operate as ultimate exit areas and re-diffusion points for light beams (352i) internally reflected within the optical plate 150. In one embodiment, all the convex sections 153 have the same size and shape, and are integrated with the base portion 151. The convex sections 153 are spaced apart from one another, and in one embodiment, they are regularly spaced apart from one another. The peak-to-peak pitch of regular spacing between convex sections 153 may be defined as the distance between a peak point of one convex section 153 and a peak point of a nearest adjacent convex section 153, and this peak-to-peak pitch dimension is denoted as Dp-p in FIG. 3. The peak-to-peak pitch dimension (Dp-p) may have various values including different values when measured in different lateral directions (e.g., X versus Y). For example, the distance Dp-p may be in the range of greater than 0 μm to about 25 μm. If the distance Dp-p is greater than the above value of about 25 μm, a desired uniform light re-scattering phenomenon may be degraded.

In the illustrated example, each convex section 153 is a frustum of a rotated ellipse and it is shown as having a cross section perpendicular to the front surface 151F, where the cross section is provided in the shape of a segment of an ellipse including a arc of the ellipse and a bottom chord linking both ends of the arc. The full ellipse satisfies Equation 1.

$$\frac{x^2}{a^2} + \frac{y^2}{b^2} = 1 \left(\text{wherein, }, 1.0 < \frac{b}{a} < 2.5\right) \quad \text{Equation 1}$$

In the ellipse, the length of a minor axis thereof is 2a and the length of a major axis thereof is 2b. The minor axis is one of orthogonal ellipse axes parallel to the front surface 151F of the base portion 151, and the major axis is also parallel to the front surface 151F while being perpendicular to the minor axis.

Referring to FIG. 3, in the optical plate 150 having the above structure, when a light ray (e.g., 351) is incident into the rear surface 151R substantially perpendicularly to the rear surface 151R, a relatively greater amount of the light may pass through the optical plate 150, and a relatively smaller amount of the light may be reflected from the optical plate 150, while almost no portion of this input light ray (351) is internally reflected within and thus shifted laterally by the optical plate 150. On the other hand, and due to the aspherical nature of the discrete light sources 160 employed herein, most of the brighter light rays (e.g., 352)—meaning comparatively higher density and higher brightness—that are incident into the rear surface 151R are so incident at a substantially non-perpendicular, oblique angle and these are ultimately output (352c) from the front surface 151F of the optical plate 150 after having undergone at least some refraction (352a—so as to be bent to an even shallower angle (not shown)) and after some having undergone internal reflection (beams 352i) within the optical plate 150. In other words, when the point light sources 160 have an orientation angle greater than or equal to about 50° and less than about 90°, and when the traveling angle of the light rays from the point light sources 160 as measured off the plane of the rear surface 151R is in the range of about 30° to about 90°, the light transmittance through rate (that associated with beam 351) through the plate 150 is greater than the ultimate reflected back rate (352b) or internally reflected rate (352i) of the input light. On the other hand, when the traveling angle of the light rays versus the rear surface 151R is in the range of about 0° to about 30°, refraction causes the straight through transmittance rate (associated with 351) of the input light to be lower and the back reflectance (352b) rate and the internally reflected rate (352i) of the input light to be comparatively. In the case where internal reflection (352i) of the light is encouraged to continuously occur, the light tends to be laterally spread out (e.g., in the X and Y directions) within the optical plate 150 and accordingly, the scattering degree of the light is increased, so that the uniformity of ultimately output light (352c) is increased.

Because of the complexity of the possible combinations of outcomes based on light beam angles, light intensities, light beam densities, refraction mechanisms (based for example on refraction indices at interfaces) and so forth, it is beneficial to use computer simulations in combination with varied parameters to determine what the ultimate outcomes will be. For sake of completeness, FIG. 3 shows that beams 352b reflected back from rear surface 151R to reflective plate 170' may return as reflected upwardly beams 352r. When internally reflected beams such as 352i intersect with a convex section 153 rather than with the planar front surface, they may not continue to be internally reflected but instead may become ultimately output beams 352c. The radius of curvature at the point of ultimate output 352c may dictate how the ultimately output beams 352c are refracted and diffused or re-concentrated upon output and thus the design of the elliptical convex sections 153 is a factor to be considered during computer simulations.

Still referring to FIG. 3, when the shortest distance between the plane of the front surface 151F to the major axis vertex of the ellipse is h, it has been found that it is desirable that the range of that projection height distance, h satisfies the condition: 25 μm<h<100 μm. The length of the chord may be set as a value to minimize a Moiré phenomenon. When the length of the chord is p, where the chord is the longest segment of intersection of the 151F plane with the elliptical projection 153, the desired range of the chord length p has been found to be 50 μm<p<200 μm. The undesired Moiré phenomenon may occur because light subject to the two periodic patterns causes repeated points of constructive interference and of destructive interference. Since a pattern having a period greater than that of an original pattern is created due to the interference of light and then caught by the user's eyes, the length p of the chord should be adjusted to prevent the pattern having a period greater than the period of the original pattern from being created, this thereby minimizing the occurrence of the undesired Moiré phenomenon.

As the ratio (b/a) of the major axis to the minor axis of the elliptical projection 153 is increased, and the angle θ of the hypotenuse of the b/a right triangle relative to plane 151F is increased, the transmittance of light output upward from an upper portion of the point light sources 160 perpendicularly to the plane of front surface 151F tends to increase. Light incident into the rear surface 151R from the point light sources 160 at an oblique angle is reflected from the surface of the ellipse, and travels within the optical plate 150 to be output toward the liquid crystal display panel in the final stage.

The ratio, b/a of the major axis to the minor axis is preferably greater than about 1.0 and less than about 2.5. In the convex section 153, when an angle between the front surface 151F and a line linking one of both ends of the arc with the peak point of the ellipse is θ, the angle θ is preferably greater than about 40° and less than about 50°. However, if the ratio b/a between the major axis and the minor axis is about 2.5 or more, and the angle θ is about 50° or more, the shape of the convex section 153 approximates a prism mountain. Accordingly, most light incident into the rear surface 151R of the optical plate 150 is reflected from the convex section 153 in this case. Therefore, the uniformity of light passing through the optical plate 150 is degraded in the latter case.

Figure 4A:
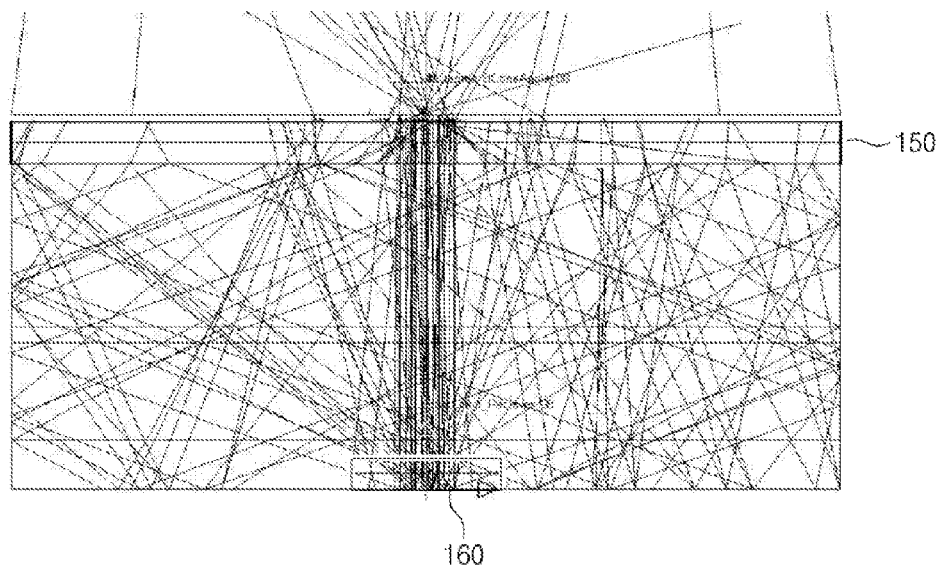
FIGS. 4A to 4C are views showing computer simulation results representing the traveling path of light rays in the display apparatus employing the discrete light sources and the optical plate and having the respective characteristics of FIGS. 2 and 3.
Figure 4B:
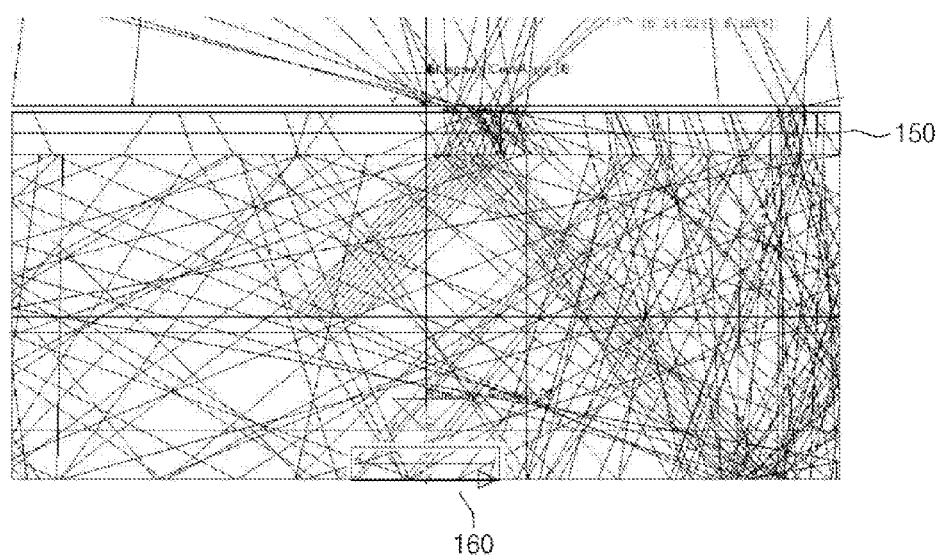
Figure 4C:
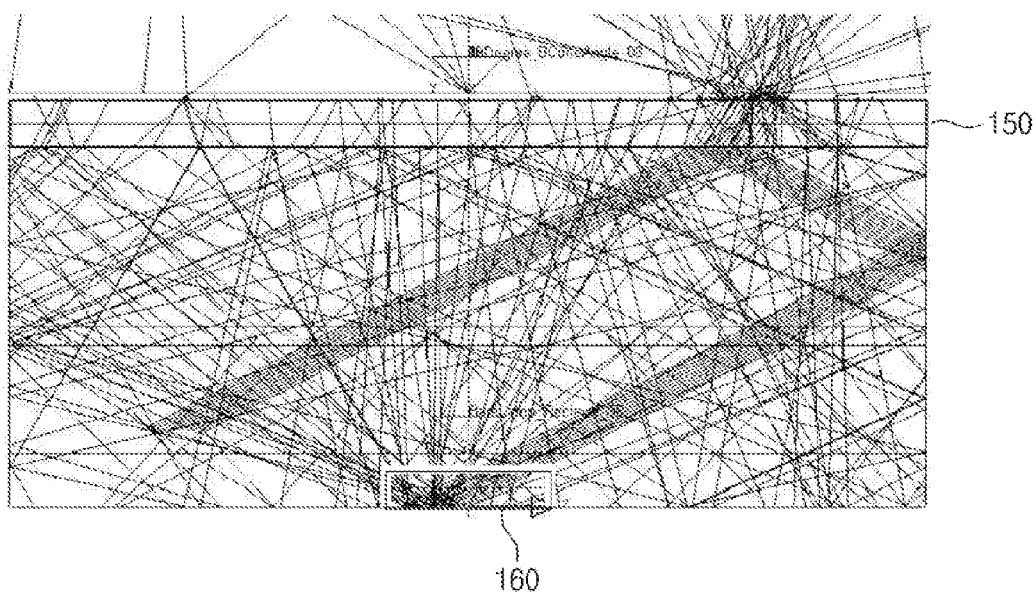

FIGS. 4A to 4C are respective views showing computer simulation results representing the traveling paths of various selected light rays in the display apparatus 100 when employing the optical plate 150 and using point sources, including aspherical ones having the characteristic of FIG. 2. In the diagrammed simulation results (FIGS. 4A to 4C) the convex sections 153 were of such small size that they are not readily seen relative to the dimensions of the plate 150 as a whole. Referring to the computer simulation results for the selected light rays traced for the case of FIG. 4A, when most of the light incident into the rear surface 151R is substantially perpendicular to that rear surface 151R the light tends to predominantly pass straight through the optical plate 150 to continue its travel upward. In other words, there is little in the way of internal reflections and lateral redistribution of the light sourced from the discrete light sources. Referring to the computer simulation results for the selectively traced light rays for the case of FIG. 4C, when most of the light is obliquely incident into the rear surface 151R such that it is internally reflected several times and then travels upward in the final stage (352c) after internal reflection, the output light tends to be more homogeneously distributed across the output side of front surface 151. Given this, when point light sources each having a relatively wide orientation angle are used, the light output from the point light source 160 and thereafter processed by the optical plate 150 tends to have a more uniform intensity and density due to being processed by the optical plate 150 as opposed to light output from conventional point light sources whose conventional orientation angle is about 0 degrees. FIG. 4B shows the same device and conditions as those of FIGS. 4A and 4C except that a different set of light rays were traced.

Figure 5:
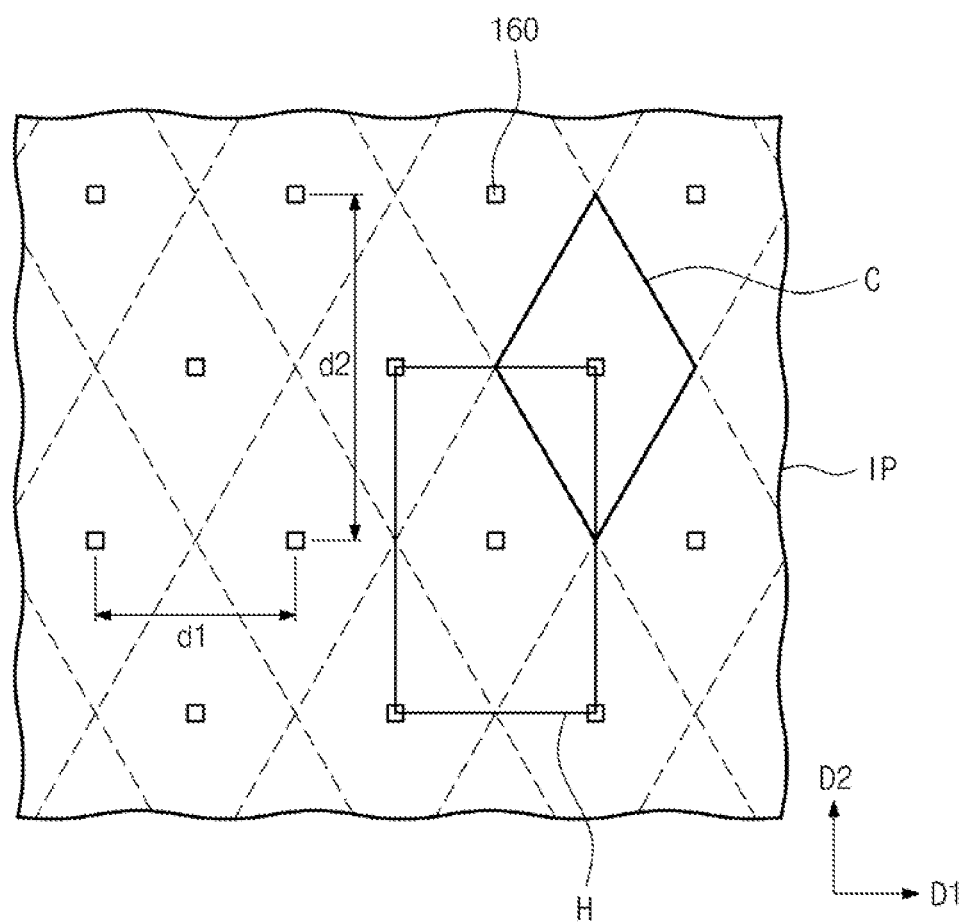
FIG. 5 is a top plan view showing the optical plate overlaid above the plurality of discrete light sources and showing an arrangement of repeated structures of the optical plate in relation the underlying discrete light sources.

FIG. 5 is a top plan view showing the optical plate 150 overlaid above the plurality of discrete light sources 160 and showing an arrangement of repeated structures (C cells) of the optical plate in relation to the underlying discrete light sources More specifically, in FIG. 5 the point light sources 160 are shown to be regularly arranged on a first plane. The point light sources 160 are arranged to be spaced apart in a first direction D1 at a first pitch dimension or distance d1. Moreover, the point light sources 160 are arranged to be spaced apart in an orthogonal second direction D2 at a second pitch dimension or distance d2. The first and second distances d1 and d2 may have different values or the same value. In one embodiment, the first distance d1 is in the range of about 22 mm to about 27 mm while the second distance d2 is in the range of about 25 mm to about 30 mm.

As mentioned, in one embodiment, all point light sources 160 are provided on the same plane. However that plane need not coincide with the top major surface of reflective plate 170. Although not shown, the point light sources 160 may be mounted on an additional and transparent substrate so that their light emitting faces are interposed along a virtual plane positioned a desired first distance above the top major surface of reflective plate 170 and positioned a desired second distance below rear surface 151R or plate 150. When the virtual plane of the point light sources 160 coincides with the light exit surface of each respective point source, the exit surfaces are caused to be parallel to the display panel 120. The light exit surfaces may be co-planar with a top surface of the transparent substrate (not shown) that supports them. Alternatively, the light exit surfaces may be disposed below the top surface of the transparent substrate (not shown) that supports them and the top surface of the transparent substrate (not shown) may define the aspherical lens means of the discrete light sources 160.

The exit surfaces of the discrete light sources 160 may be modeled as each contributing light to a corresponding one of a plurality of virtual area cells C on a one-to-one basis where each C cell is disposed on an overlying section of the optical plate 150. Each cell C may have a selected one of various shapes that may be tessellated across a contribution-receiving portion of the optical plate 150. For example, each area cell C may be deemed to have a polygonal shape such as a diamond, a rectangle, a hexagon or another honeycomb shape. If the point light sources 160 are identical to each other, the cells C have the same sizes and shapes. Although the present embodiment has been described in that the first distance d1 is different from the second distance d2, the present embodiment is not limited thereto. In other words, the first distance d1 may be identical to the second distance d2. In this case, the cell C may be provided in a square shape.

Each cell C has at least a minimum area that covers the light outputting surface of its respective one point light source 160, although each cell C may have a larger area (as is shown) corresponding to its one discrete light source 160. The point light source 160 is deemed to be provided at the center of the cell C to supply light aspherically to the whole area of the cell C. Ideally, the optical plate 150 and/or light processing elements of the backlighting unit function to cause the light output from each cell C as uniformly as possible.

In the display apparatus 100 having the above structure, the uniformity of light output from the combination of the point light sources 160, the optical plate 150 and the reflective plate 170 can be made relatively high. In addition, when compared with the conventional point light source, the wide-beam point light sources 160 have the relatively wide orientation angle which helps to prevent formation of bright points. In addition, the optical plate 150 can compensate for the degradation of light transmittance occurring when spaced apart point light sources having the relatively wide orientation angle are used. More specifically, the optical plate 150 is designed as a counter-compensating partner to the wide-beam discrete light sources 160 because the optical plate 150 is designed to well receive the oblique light rays of the wide-beam point light sources 160 and to redistribute those light rays by means of internal reflection (352i) and to ultimate output (352c) the light in a substantially homogenous manner. The redistribution operates laterally through the body of the optical plate 150 by means of internal reflection (352i). Therefore, the distance between the display panel 120 and the lower cover 180 can be reduced because large vertical spacings apart are not need for the laterally operating light redistribution that takes place by internal reflection in the body of the optical plate 150. Accordingly, a thin display apparatus can be provided. In such a display apparatus, the defect of the bright point is reduced to improve display quality.

More specifically and according to the first embodiment, since the point light sources 160 are not surface normal light sources but rather transverse sources, light intensity and density at the center of each corresponding cell C is not so much different from light intensity and density at the edge of the cell C. According to one embodiment of the present disclosure, to create uniform light intensity and light density across the whole exit surface of the backlighting unit, the optical plate 150 is provided in a manner where the density of occurrence of the convex sections 153 is adjustable and is adjusted different in different regions of each C cell so as to more uniformly redistribute and output the internally reflected light rays.

Figure 6:
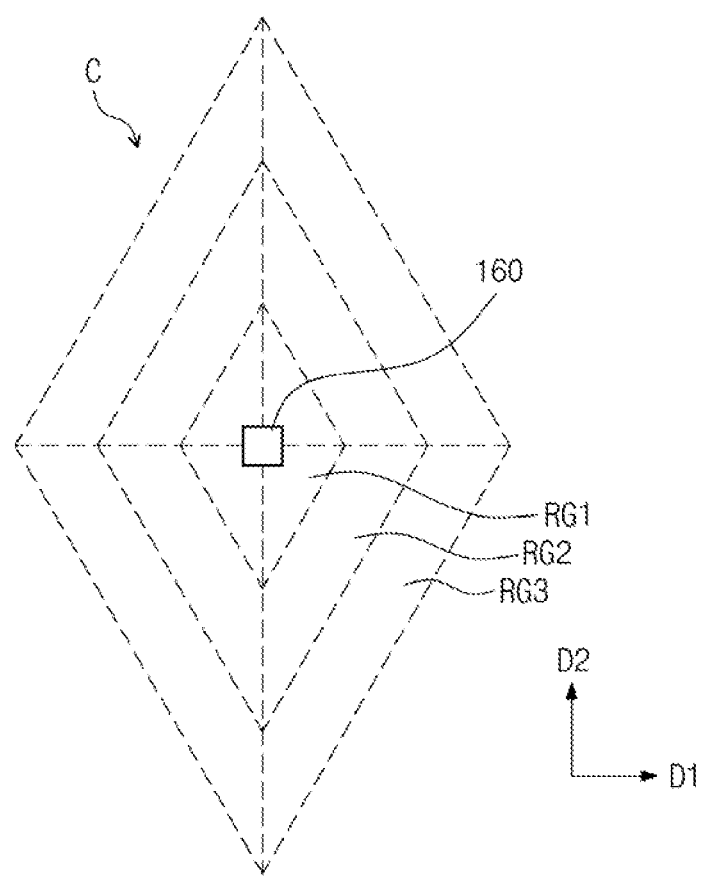
FIG. 6 is a top plan view showing one of the repeated cell units (C) of the optical plate and it is at the same time an enlarged view of part C of FIG. 5.

FIG. 6 is a top plan view showing one cell C associated with an optical plate in a display apparatus according to one embodiment. FIG. 6 may be considered an enlarged plan view showing an exemplary one cell C of FIG. 5. Hereinafter, the one embodiment will be described while focusing on the specific structure of the diamond shaped version of the C cell.

According to the illustrated embodiment, the cells C are provided in the shape of non-rectangular diamonds. Since all cells C have the same size and shape, only one diamond-shape cell will representatively be described below with reference to FIG. 6.

Referring to FIG. 6, the cell C has four vertexes. The vertexes include two pairs of vertexes that are facing each other along a corresponding direction, D1 or D2. In the cell C, one diagonal line (of a corresponding pair of facing vertexes) is longer than the other diagonal line. According to the present embodiment, the shorter diagonal line is parallel to the first direction D1, and the longer diagonal line is parallel to the second direction D2. In this case, the shorter diagonal line of the diamond has a value identical to the first distance d1 (see FIG. 5), and the longer diagonal line of the diamond has a value identical to the second distance d2. The first and second distances d1 and d2 may have various values. For example, in one embodiment, the first distance d1 is preferably in the range of about 22 mm to about 27 mm, while the second distance d2 is preferably in the range of about 25 mm to about 30 mm.

Referring to FIG. 6, the cell C is disposed so that the center thereof aligns with the center of the corresponding point light source 160. The C cell is divided into a plurality of diamond-shaped annular or inner full regions sequentially distanced from the center of the point light source 160. The regions may have a polygonal shape or a ring shape in other embodiments (not shown).

In the optical plate 150, the density of the convex sections 153 may be varied depending on how the diamond-shaped annular regions of cell C are provided. As used herein, the term, "density of the convex sections" of the optical plate 150 refers to a count from the top plan view of the convex sections 153 per the corresponding whole unit area (e.g., bumps per $cm^2$). When the convex sections 153 have a uniform size and shape, the number of the convex sections 153 per unit area may be increased as the distance between two adjacent convex sections is narrowed. Accordingly, the distance between the two adjacent convex sections is adjusted, so that the density of the convex sections 153 in the unit area may be variously adjusted. In this case, the light passing through a region of the optical plate 150 having the higher density of the convex sections 153 has a light outputting and light re-scattering degree higher than that of the light passing through a region of the optical plate 150 having the lower density of the convex sections 153. Therefore, the whole uniformity of light passing through the optical plate 150 can be increased by selectively adjusting the density of the convex sections 153 in the optical plate 150 for each region (e.g., RG1, RG2, RG3) of the respective cell area C.

According to the illustrated embodiment, the convex sections 153 in two adjacent diamond-shaped annular regions of the cell C may be provided at respective different densities.

Referring to the example of FIG. 6, the cell C is divided into three diamond-shaped annular or filled regions as shown. The three diamond-shaped annular regions are respectively denoted as a first region RG1, a second region RG2, and a third region RG3, respectively, according to the distance from the point light source 160. The first region RG1 has a filled diamond shape, and the second region RG2 has a diamond-ring shape surrounding the first region RG1. The third region RG3 has a diamond-ring shape surrounding the second region RG2.

In one embodiment, the respective density of the convex sections 153 in the first to third regions RG1, RG2, and RG3 is progressively lowered when moving in a direction from the first region RG1 to the third region RG3.

In the exemplary cell C of FIG. 6, since light traveling within the first region RG1 is reduced due to the aspherical nature of the discrete light source 160, the density of the convex sections 153 should be increased corresponding to the desired intensity and density of to be output light (352c). In addition, the third region RG3 is farthest away from the point light source 160, so that light traveling within the third region RG3 tends to have the lowest intensity and density due to r-squared effects. Accordingly, the density of the convex sections 153 should also be increased in RG3 corresponding to the desired intensity and density of to be output light (352c). The second region RG2 receives more incident light due to the aspherical nature of the discrete light source 160 and accordingly, the density of the convex sections 153 in RG2 should be decreased relative to RG1 so as to obtain the desired intensity and density of to be output light (352c).

Specific densities of the convex sections 153 may vary according to many variables. According to one embodiment, when the diameter of each convex section 153 is about 100 μm, the first distance d1 is about 25 mm, and the second distance d2 is about 28 mm on the exit surface IP, the distance Dp-p between two adjacent convex sections 153 may be in the range of about 6 μm to about 8 μm in the first region RG1. In this case, the distance Dp-p between two adjacent convex sections 153 may be in the range of about 13 μm to about 15 μm in the second region RG2. In addition, the distance Dp-p between two adjacent convex sections 153 may be in the range of about 20 μm to about 22 μm in the third region RG3. More particularly, the distance Dp-p between two adjacent convex sections 153 in the first region RG1 is about 7 μm, and the distance Dp-p between two adjacent convex sections 153 in the second region RG2 is about 14 μm. The distance Dp-p between two adjacent convex sections 153 in the third region RG3 is about 21 μm.

Figure 7:
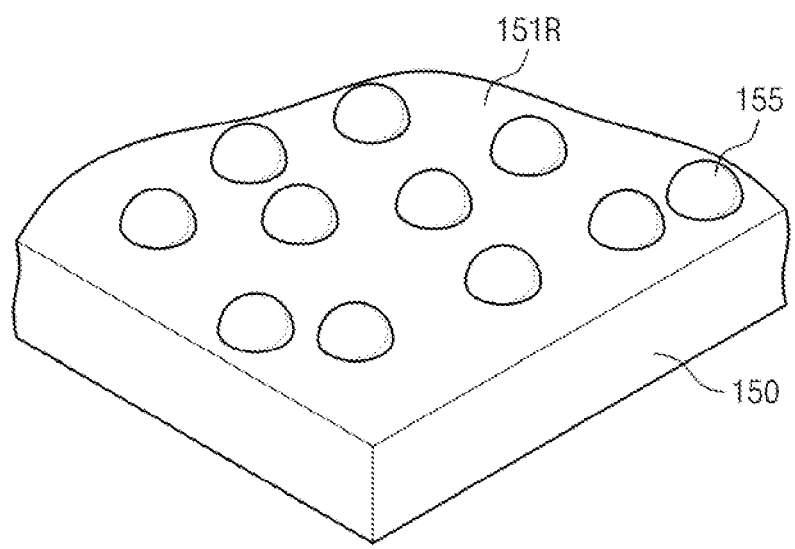
FIG. 7 is a perspective view showing a portion of a rear surface of an optical processing plate belonging to a modified embodiment that has hazing components.

According to another embodiment, to increase the scattering degree of light passing through the optical plate 150, the optical plate 150 may include a haze pattern 155 on its rear surface 151R. FIG. 7 is a perspective view showing the upside-down structure of the optical plate 150, in which a rear surface of a base of the optical plate is positioned at the top. Hereinafter, the haze-including embodiment will be described while focusing on the difference from the non-haze-including embodiment. Components that have been described in the first embodiment will be omitted, and the same reference numbers will be designated to the same components.

Referring to FIG. 7, according to the haze-including embodiment, haze patterns 155 protrude from the rear surface 151R of the base portion 151 and are randomly arranged on the rear surface 151R. The haze patterns 155 are used to randomly scatter light passing through the optical plate 150. The scattering degree of the light passing through the optical plate 150 may be controlled by controlling the average density of the hazy patterns 155.

The haze patterns 155 may be protrusions protruding from the rear surface 151R to scatter light, but they are not limited to that specific shape. For example, the haze patterns 155 may include portions of plural spheres, that is, a plurality of hemi-spheres. The protrusions may have various sizes. If the protrusions are provided in the shape of hemispheres, the size (diameter) of the hemi-spherical protrusions may be preferably in the range of about 20 μm to about 70 μm. More preferably, the size of the hemi-spherical protrusions may be about 50 μm. If the size of the hemi-spherical protrusion is less than about 30 μm, the hemi-spherical protrusion should not be formed. If the size of the hemi-spherical protrusion is greater than about 70 μm, the light scattering phenomenon may be degraded. In this case, the height of each hemispherical protrusion may be in the range of about 15 μm to about 25 μm.

To increase the uniformity of light passing through the optical plate 150, the haze patterns 155 are formed at different densities according to the positions of the point light sources 160. The density of the haze patterns 155 refers to an area of the haze patterns 155 per unit area of the optical plate 150.

Figure 8:
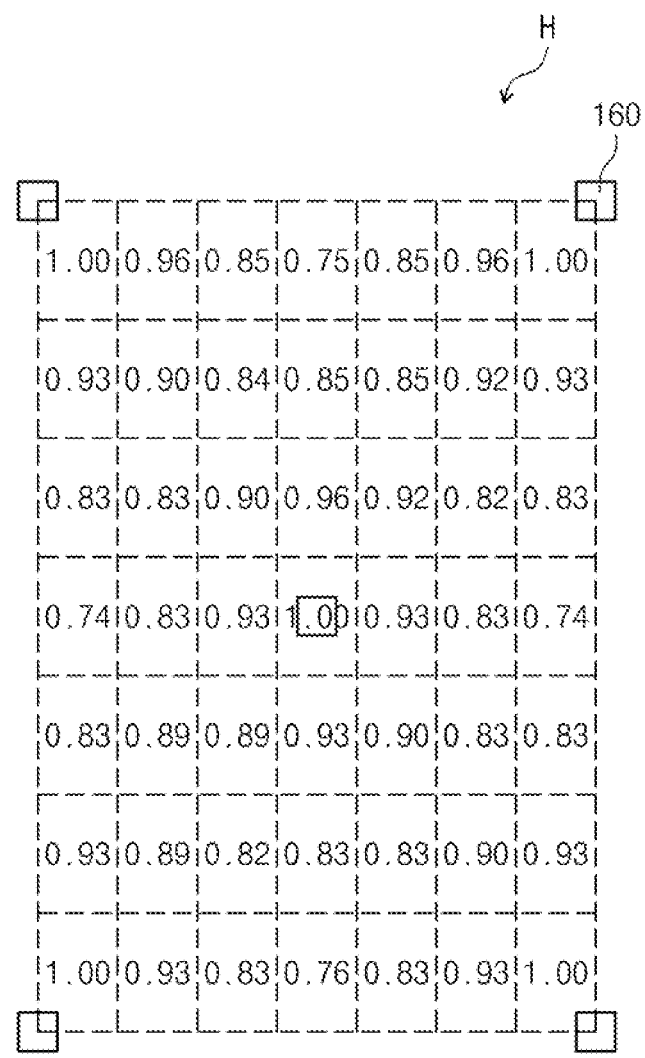
FIG. 8 is a top plan schematic view showing densities of haze patterns used in one embodiment of FIG. 7, and showing an area H of FIG. 5.

FIG. 8 is a plan view showing the density of the haze patterns 155 corresponding to the arrangement of the point light sources 160, and shows a hazing area H of FIG. 5. In this case, numbers marked in FIG. 8 are relative values representing the densities of the haze patterns 155. The density of the haze patterns 155 is represented as 1.0 when the protrusions are most densely formed on the rear surface 151R without much distance between adjacent protrusions.

Referring to FIG. 8, portions of the optical plate 150 at which the density of the haze patterns 155 is about 1.0 correspond to positions where the point light sources 160 are provided. The density of the haze patterns 155 provided corresponding to between the adjacent point light sources 160 is lower than the density of the haze patterns 155 provided at a position corresponding to the point light sources 160. Since the highest intensity of light is here assumed to be at the position where the point light sources 160 are provided, the highest density of the haze patterns 155 is taken at the position where the point light sources 160 are provided, so that the light is scattered as much as possible in this maximally illuminated area. In this case, the density of the haze patterns 155 provided at the position corresponding to between the adjacent point light sources 160 corresponds to about 20% to about 90% of the density of the haze patterns 155 provided at the position corresponding to the point light sources 160. Light, which is incident upward in the perpendicular direction, is less emitted between the adjacent point light sources 160. Accordingly, the haze pattern 155 should be formed between the adjacent point light sources 160, so that the scattering degree of the light can be increased.

To more increase the scattering degree of the light, the haze pattern 155 may include about 1800-mesh beads to about 2000-mesh beads.

According to the display apparatus including the optical plate 150 having the above structure, the uniformity of light incident into the display panel is improved to enhance display quality.

Experimental Example 1

Relation Between Aspect Ratio and Intensity of Light According to Zenith Angle

Figure 9A:
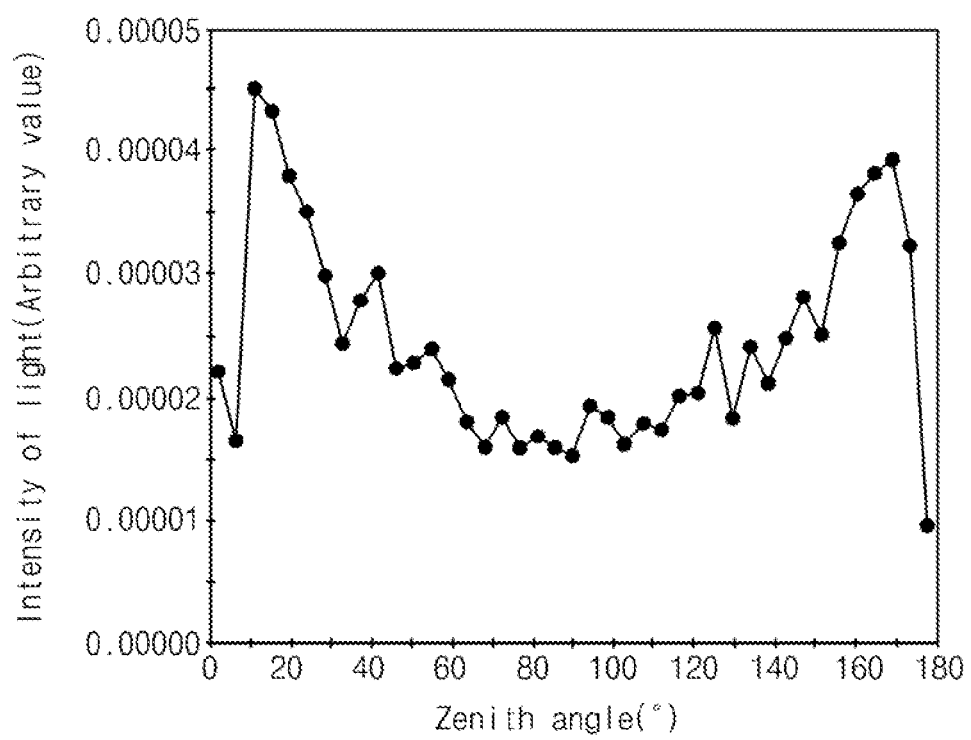
FIGS. 9A to 9C are graphs showing computer simulations for the intensity of light passing through the optical plate according to zenith angle when an aspect ratio is set at different values.
Figure 9B:
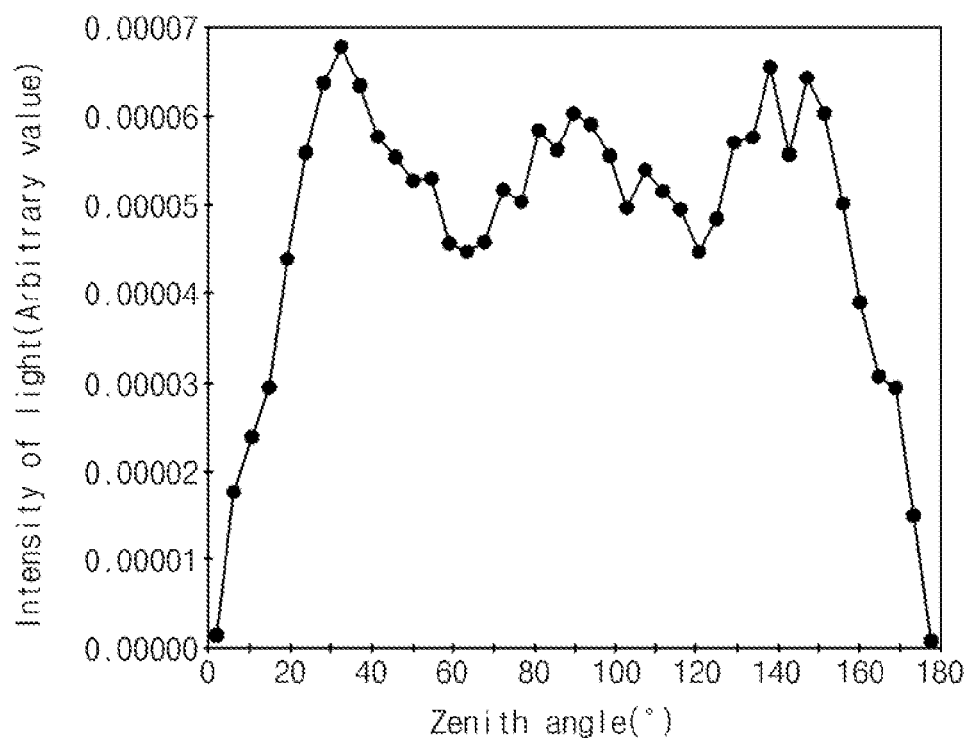
Figure 9C:
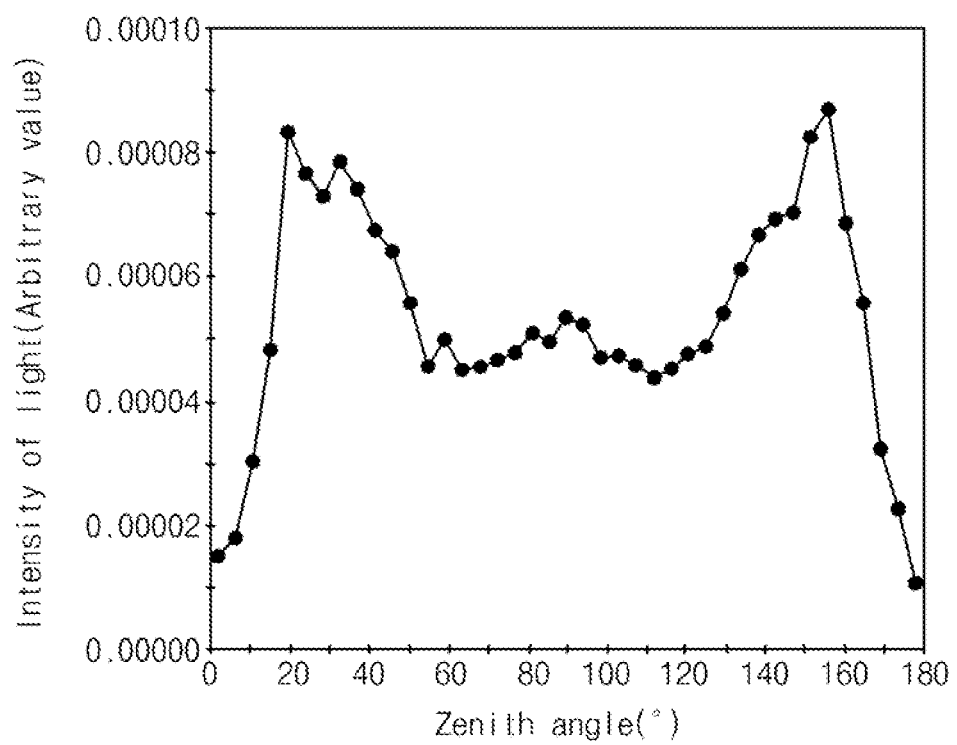

FIGS. 9A to 9C are graphs showing a computer simulation for the intensity of light passing through the optical plate 150 according to an zenith angle when $$\frac{b}{a}$$

is set as a different value for each of 9A-9C. In this case, the intensity of the output light is measured by using a wide-view-angle LED having an orientation angle of about 70°, and setting the distance between the wide-view-angle LED and the optical plate 150 as about 10 mm. In this case, x and y axes represent the zenith angle and the relative value of the intensity of the light, respectively. Considering that light emitted at a lower zenith angle passes through the display panel 120 does not make bright and dark points, it should be noted that the uniformity of light emitted at a zenith angle of about 90° exerts a great influence on the display quality of the display apparatus 100.

FIG. 9A is a graph when $$\frac{b}{a}$$

is 0.5, and FIG. 9B is a graph when $$\frac{b}{a}$$

is 0.8. FIG. 9C is a graph when $$\frac{b}{a}$$

is 1.2. In FIGS. 9A and 9B, the uniformity of the intensity of light is degraded at the zenith angle of about 90°. In FIG. 9C, the intensity of the light is relatively more uniform at the zenith angle of about 90° when comparing with FIGS. 9A and 9B.

Experimental Example 2

Relation Between Brightness and Angle θ and Aspect Ration of Convex Section

Figure 10:
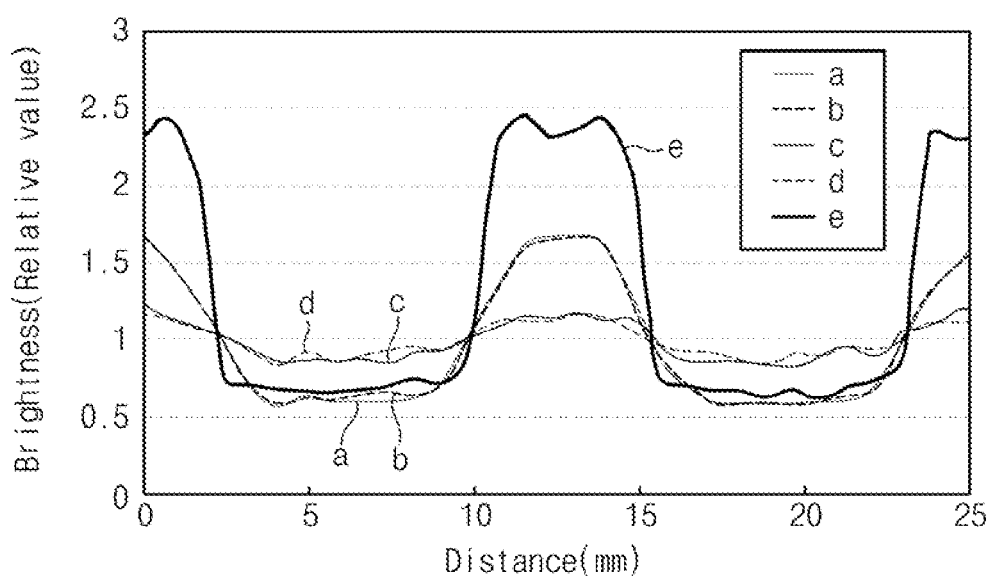
FIG. 10 is a graph showing a computer simulation for the variation in the brightness of light passing through the optical plate when θ and an aspect ratio vary in the convex section of the optical plate.

FIG. 10 is a graph showing a computer simulation for the variation in the brightness of light passing through the optical plate 150 when θ and $$\frac{b}{a}$$

vary in the convex section 153 of the optical plate 150. In the present experimental example, a wide-view-angle LED having an orientation angle of about 70° is used, and the distance between the wide-view-angle LED and the optical plate 150 is set as about 10 mm. In this case, an x axis represents the relative value of the distance from one light source when the distance between adjacent light sources is set as 1, and a y axis represents the relative value of brightness. In the graph of FIG. 10, reference symbol a represents a case in which $$\frac{b}{a}$$

is about 1.8 and θ is about 30°, reference symbol b represents a case in which $$\frac{b}{a}$$

is 1.8, and θ is 34°, and reference symbol c represents a case in which $$\frac{b}{a}$$

is about 2.2, and θ is about 42°. Reference symbol d represents a case in which $$\frac{b}{a}$$

is 2.4, and θ is about 48°, and reference symbol e represents a case in which the optical plate 150 is not used. Referring to FIG. 10, as $$\frac{b}{a}$$

is increased from about 1.8 to about 2.4, and θ is increased from about 30° to about 48°, the uniformity of the whole brightness values is enhanced regardless of the position of the point light sources.

Experimental Example 3

Relation Between Illuminance, and θ and Aspect Ratio of Convex Section

Figure 11A:
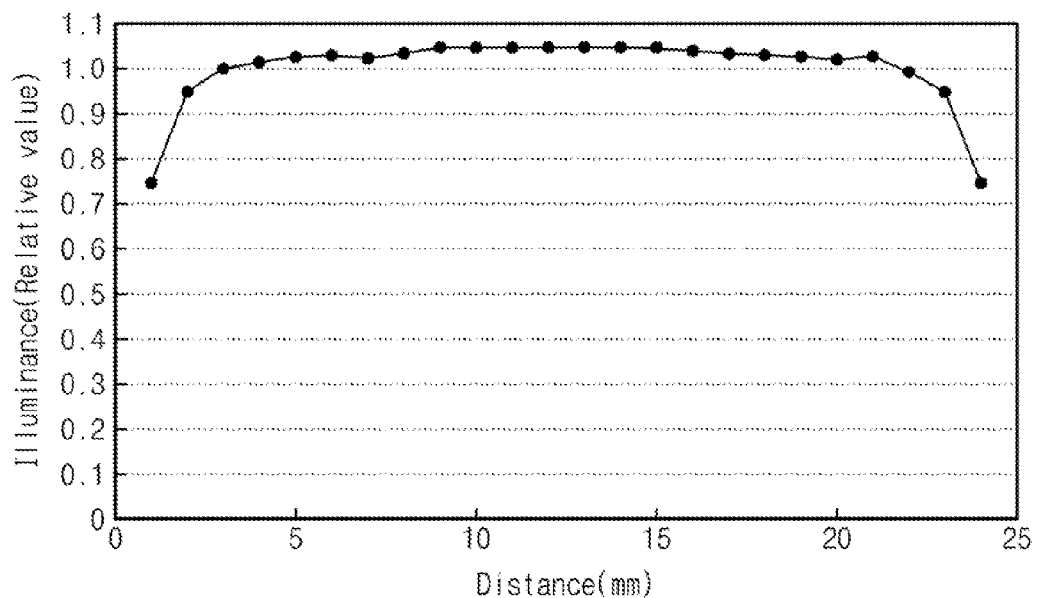
FIGS. 11A and 11B are graphs showing a simulation representing the variation in the illuminance of light passing through the optical plate when θ and an aspect ratio vary in the convex section of the optical plate.
Figure 11B:
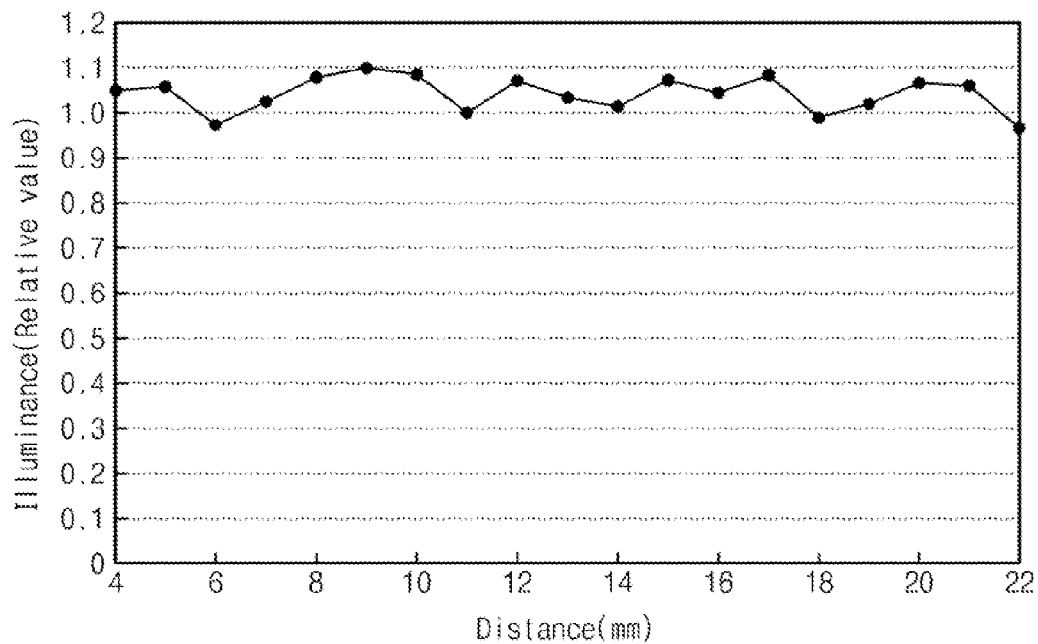

FIGS. 11A and 11B are graphs showing a computer simulation representing the variation in the illuminance of light passing through the optical plate 150 when the angle θ and $$\frac{b}{a}$$

vary in the convex section 153 of the optical plate 150. Simulation conditions of FIGS. 11A and 11B are identical to those of Experimental Example 2 except for the values of θ and $$\frac{b}{a}.$$

FIG. 11A is a graph showing a case in which $$\frac{b}{a}$$

is about 2.0, and θ is 45°, and FIG. 11B is a graph showing a case in which $$\frac{b}{a}$$

is about 2.4, and the angle θ is 47°. In this case, an x axis represents a distance from one light source, in which the distance between adjacent light sources is about 25 mm.

Referring to FIGS. 11A and 11B, when the optical plate 150 has the above values of $$\frac{b}{a}$$

and θ, the uniformity of the whole illuminance can be improved regardless of the position of the point light sources 160. Particularly, when the angle θ is 45° or 48°, the uniformity of brightness distribution of light reaches about 80%. Although not shown, when the angle θ is 42° or 48°, the uniformity of brightness distribution of light reaches about 80%.

Although the exemplary embodiments in accordance with the present teachings have been described, it is understood that the present teachings should not be limited to these exemplary embodiments but various changes and modifications can be made by one ordinary skilled in the art in view of these teachings and within the spirit and scope of the present disclosure.

What is claimed is:

1. A display apparatus comprising:
   a display panel;
   a plurality of spaced apart point light sources each having an orientation angle that is greater than or equal to about 50° and is less than about 90°, the orientation angle being a zenith angle of an output light ray representing a highest intensity among light rays output from each of the plurality of spaced apart point light sources; and
   an optical plate interposed between the display panel and the point light sources and comprising a base comprising front and rear surfaces and a plurality of convex sections formed on the front surface of the base, the optical plate being structured to encourage internal reflection therein of light beams received thereby at or substantially near the orientation angle so as to thereby laterally reposition the light of those beams before they are ultimately output from the optical plate,
   wherein the point light sources are provided along a first plane and a parallel second plane is defined as extending through the optical plate and comprising a plurality of cells each corresponding to one of the point light sources in a one-to-one correspondence, and
   wherein each cell comprises a plurality of regions sequentially disposed across the cell, and the convex sections within different ones of the regions have densities different from those of adjacent other regions of the cell.

2. The display apparatus of claim 1, further comprising a reflective plate provided to reflect back to the optical plate, light reflected form the optical plate.

3. A display apparatus comprising:
   a display panel;
   a plurality of point light sources each having an orientation angle that is greater than or equal to about 50° and is less than about 90°, the orientation angle being a zenith angle of an output light ray representing a highest intensity among light rays output from each of the plurality of spaced apart point light sources; and
   an optical plate interposed between the display panel and the point light sources and comprising a base comprising front and rear surfaces and a plurality of convex sections formed on the front surface of the base,
   wherein each convex section has a cross section perpendicular to the front surface in which the cross section has a shape of a segment of an ellipse comprising an arc of the ellipse and a chord linking both ends of the arc, and the ellipse satisfies an equation, $$1.0 < \frac{b}{a} < 2.5,$$

when a minor axis of the ellipse has a length of 2a, and a major axis of the ellipse has a length of 2b,
   wherein the point light sources are provided along a first plane and a parallel second plane is defined as extending through the optical plate and comprising a plurality of cells each corresponding to one of the point light sources in a one-to-one correspondence, and wherein each cell comprises a plurality of regions sequentially disposed across the cell, and the convex sections within different ones of the regions have densities different from those of adjacent other regions of the cell.

4. The display apparatus of claim 3, wherein the convex sections provide refraction according to traveling angles of light beams entering them, which traveling angles are defined by traveling direction of the respective light beams with respect to the front surface of the base,
wherein transmittance of the light is greater than a reflective rate of the light when the traveling angle is in a range not less than about 30° to about 90°, and
wherein the transmittance of the light is lower than the reflective rate of the light when the traveling angle is in a range of about not less than 0° to about 30°.

5. The display apparatus of claim 4, wherein the point light sources are arranged in a first direction while being spaced apart from each other at a first distance, and arranged in a second direction perpendicular to the first direction while being spaced apart from each other at a second distance different from the first distance.

6. The display apparatus of claim 5, wherein the first distance is in a range of about 22 mm to about 27 mm, and the second distance is in a range of about 25 mm to about 30 mm.

7. The display apparatus of claim 6, wherein a shortest distance between the point light sources and the optical plate is about 10 mm or less.

8. The display apparatus of claim 3, wherein an angle between the front surface and a line that links one of two ends of the arc with a vertex of the ellipse is greater than 40° and is less than 50°.

9. The display apparatus of claim 8, wherein, if a length of the chord is defined as p, and a shortest distance between the front surface and a vertex of the ellipse is defined as h, the p is greater than about 50 μm and less than about 200 μm, and the h is greater than about 25 μm and less than about 100 μm.

10. The display apparatus of claim 3, wherein the regions comprise first, second, and third regions sequentially distanced from the center of the cell, and
wherein a distance between adjacent convex sections in the first region is in a range of about 6 μm to about 8 μm, a distance between adjacent convex sections in the second region is in a range of about 13 μm to about 15 μm, and a distance between adjacent convex sections in the third region is in a range of about 20 μm to about 22 μm.

11. The display apparatus of claim 3, wherein the optical plate further comprises a plurality of protrusions protruding from the rear surface and randomly provided to scatter the light.

12. The display apparatus of claim 11, wherein a density of the protrusions provided at a position between adjacent point light sources is less than a density of the protrusions provided at a position corresponding to the point light sources.

13. The display apparatus of claim 12, wherein the density of the protrusions provided at the position between the adjacent point light sources is about 20% to about 90% of the density of the protrusions provided at the position corresponding to the point light sources.

14. The display apparatus of claim 11, wherein each protrusion is a portion of a sphere having a diameter of about 40 μm to about 60 μm, and has a height of about 15 μm to about 25 μm from the rear surface.

15. The display apparatus of claim 11, wherein the protrusions comprise 1800-mesh beads to 2000-mesh beads.

16. The display apparatus of claim 3, further comprising a reflective plate provided in opposition to the rear surface to reflect the light.

17. The display apparatus of claim 16, wherein a distance from the reflective plate to the display panel is in a range of about 18 mm to about 22 mm.

18. The display apparatus of claim 3, wherein each point light source is an aspherical light emitting diode.

19. A backlight unit comprising:
a plurality of point light sources each having an orientation angle that is greater than or equal to about 50° and is less than about 90°, the orientation angle being a zenith angle of an output light ray representing a highest intensity among light rays output from each of the plurality of spaced apart point light sources; and
an optical plate provided above the point light sources and comprising a base comprising front and rear surfaces and a plurality of convex sections formed on the front surface of the base,
wherein each convex section has a cross section perpendicular to the front surface in which the cross section has a shape of a segment of an ellipse comprising an arc of the ellipse and a chord linking both ends of the arc, and the ellipse satisfies an equation $$1.0 < \frac{b}{a} < 2.5$$

when a minor axis of the ellipse has a length of 2a, and a major axis of the ellipse has a length of 2b,
wherein the point light sources are provided along a first plane and a parallel second plane is defined as extending through the optical plate and comprising a plurality of cells each corresponding to one of the point light sources in a one-to-one correspondence, and
wherein each cell comprises a plurality of regions sequentially disposed across the cell, and the convex sections within different ones of the regions have densities different from those of adjacent other regions of the cell.

20. The backlight unit of claim 19, wherein the convex sections reflect or transmit the light according to a traveling angle, which is defined by a traveling direction of the light with respect to the front surface of the base,
wherein transmittance of the light is greater than a reflective rate of the light when the traveling angle is in a range of not less than about 30° to about 90°, and
wherein the transmittance of the light is lower than the reflective rate of the light when the traveling angle is in a range of not less than about 0° to about 30°.

21. A method of converting light output from a plurality of spaced apart point light sources into substantially uniform surface source light, the method comprising:
providing the point light sources each as an aspherical light source, the aspherical light source having an orientation angle that is greater than or equal to about 50° and is less than about 90°, the orientation angle being a zenith angle of an output light ray representing a highest intensity among light rays output from each of the plurality of spaced apart point light sources; and
providing an optical plate disposed above the point light sources, the optical plate being structured to encourage internal reflection therein of light beams received thereby at or substantially near the orientation angle so as to thereby laterally reposition the light of those beams before they are ultimately output from the optical plate,
wherein the point light sources are provided along a first plane and a parallel second plane is defined as extending through the optical plate and comprising a plurality of cells each corresponding to one of the point light sources in a one-to-one correspondence, and wherein each cell comprises a plurality of regions sequentially disposed across the cell, and convex sections within different ones of the regions have densities different from those of adjacent other regions of the cell.

* * * * *